US012777373B2

(12) United States Patent
Kwok et al.

(10) Patent No.: US 12,777,373 B2
(45) Date of Patent: Oct. 27, 2026

(54) LOCAL NETWORK CHARACTERISTICS-BASED DOWNLINK DATA COMMUNICATION MANAGEMENT

(71) Applicant: T-Mobile USA, Inc, Bellevue, WA (US)

(72) Inventors: Ming Shan Kwok, Seattle, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 302 days.

(21) Appl. No.: 18/444,308

(22) Filed: Feb. 16, 2024

(65) Prior Publication Data

US 2025/0267521 A1 Aug. 21, 2025

(51) Int. Cl.

| | |
|---|---|
| ***H04W 28/22*** | (2009.01) |
| ***H04W 72/044*** | (2023.01) |
| ***H04W 72/1273*** | (2023.01) |

(52) U.S. Cl.

CPC ....... *H04W 28/22* (2013.01); *H04W 72/0473* (2013.01); *H04W 72/1273* (2013.01)

(58) Field of Classification Search

None

See application file for complete search history.

(56) References Cited

U.S. PATENT DOCUMENTS

| | | | | |
|---|---|---|---|---|
| 10,200,245 | B2 * | 2/2019 | Edwards | H04L 1/002 |
| 11,678,258 | B2 * | 6/2023 | Lee | H04W 48/08 370/329 |
| 12,382,327 | B2 * | 8/2025 | Wu | G01S 5/0072 |
| 2015/0009989 | A1 * | 1/2015 | Han | H04L 41/30 370/390 |
| 2016/0380824 | A1 * | 12/2016 | Vuornos | H04W 48/14 370/259 |
| 2018/0039243 | A1 * | 2/2018 | Bangalore | A01G 25/16 |
| 2020/0112865 | A1 * | 4/2020 | Radmand | H04W 40/20 |
| 2022/0303913 | A1 * | 9/2022 | Sevindik | H04W 52/343 |
| 2023/0076300 | A1 * | 3/2023 | Ta | G06Q 30/0244 |

* cited by examiner

*Primary Examiner* — Phirin Sam

(74) *Attorney, Agent, or Firm* — Lee & Hayes, P.C.

(57) ABSTRACT

A system for network characteristics-based downlink data communication management, and a method therefore are described. For example, a system includes a processor; and computer-readable instructions that, when executed by the processor, cause the system to perform operations including receiving, by a gateway and via a regional network, downlink data. The operations include analyzing, by a scheduler in the gateway, a difference between a regional data rate and a local data rate of the downlink data to identify the difference as a data rate difference that is greater than a threshold difference. The operations include, in response to the analyzing of the difference, generating, by the gateway, a parameter utilized to adjust the regional data rate.

20 Claims, 5 Drawing Sheets

LOCAL NETWORK CHARACTERISTICS-BASED DOWNLINK DATA COMMUNICATION MANAGEMENT

BACKGROUND

As technology has progressed in communications networks, performance, quality, and reliability of the networks has increased. Networks utilized to communicate data include regional networks, such as cellular or mobile networks, and local networks, such as local area networks (LANs), with various capabilities. Downlink data is transmitted by regional network devices, such as base stations, and to destination devices, such as user equipment (UEs). The downlink data is, possibly, routed through local network devices. The cellular or mobile networks, such as fifth-generation (5G) networks, are utilized along with the LANs, such as wi-fi networks, to communicate the downlink data. Capabilities of the cellular network devices and the LAN devices effect transmission and delivery related characteristics of the downlink data being communicated in the cellular networks and local area networks.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
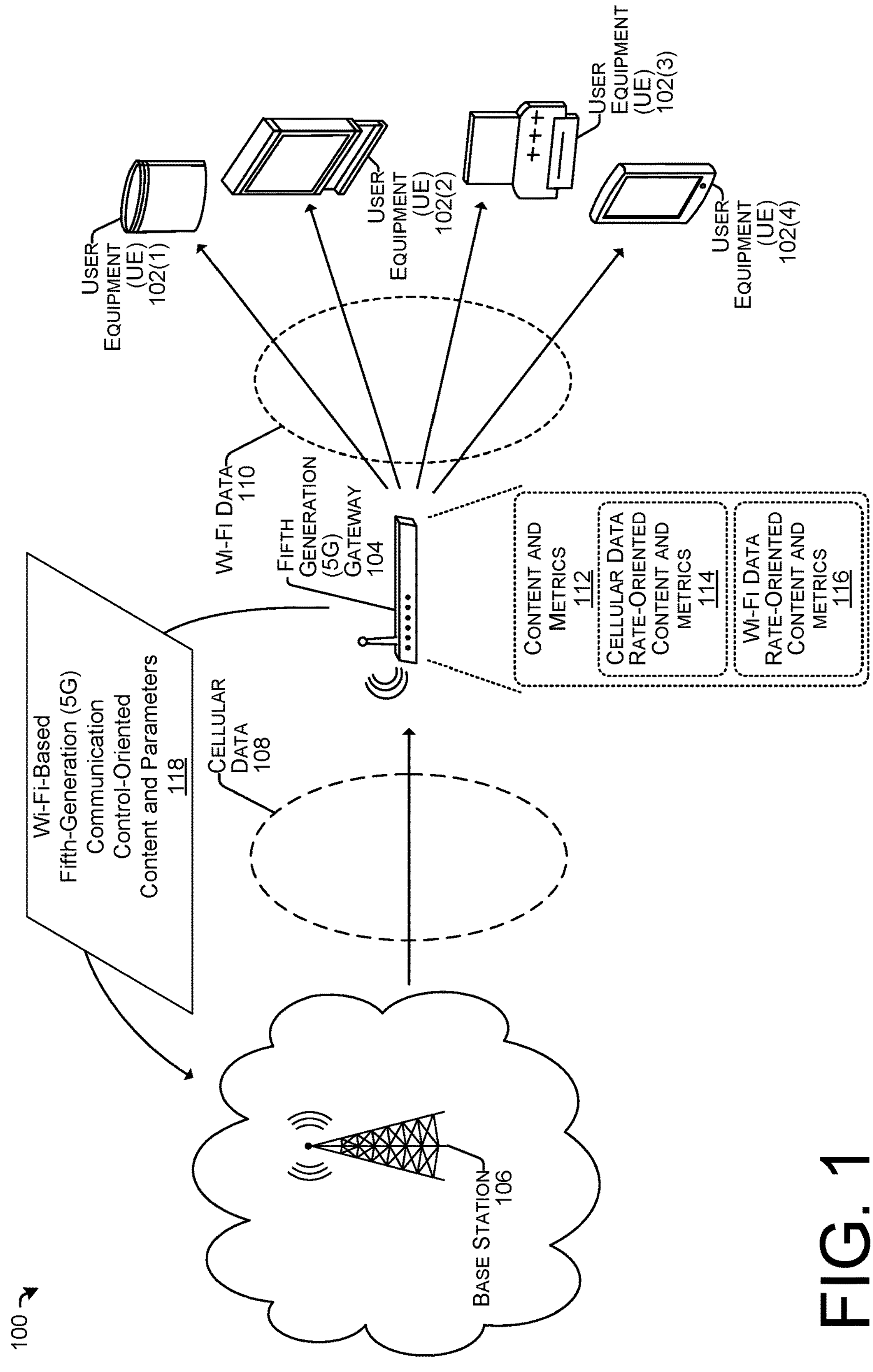
FIG. 1 is an exemplary system for network characteristics-based downlink data communication management.

This disclosure is directed to systems and techniques for local network characteristics-based downlink data communication management. Some example systems and techniques described herein can utilize the network characteristics to control data flow associated with network communications. Controlling the data flow can include throttling data flow (e.g., changing a data rate, such as reducing) associated with regional network communications. For example, the data flow can be throttled based on data flow associated with the regional network communications, such as fifth-generation (5G) communications, being greater than data flow associated with the local network communications (e.g., local area network (LAN) communications), such as wi-fi communications.

The data flow can be controlled to improve downlink communications exchanged by regional and local networks and to destination devices. Regional network devices, such as 5G base stations, can be utilized to throttle the regional network communications. Local network devices, such as 5G gateways, can be utilized to identify the network characteristics. The network characteristics can include regional network characteristics and local network characteristics, such as 5G network characteristics and wi-fi characteristics, respectively.

By way of example, cellular data can be controlled through throttling frameworks to optimize end-to-end data flow between cellular and/or wi-fi network connected gateways. In some cases, cellular gateways, such as the 5G gateways, which can include home internet wireless gateways and/or mobile hotpots, can be utilized to gather network performance related content, such as the network characteristics. The gathered content can be utilized to control the flow of data, which can include downlink data being transmitted by base stations of the cellular networks and to end devices of wi-fi networks, and through the cellular gateways. For instance, the flow of data between the base stations and the 5G gateways can be throttled (e.g., reduced or otherwise altered) to synchronize rates associated with the data flow between the regional networks and local networks (e.g., LAN), such as 5G networks and wi-fi networks, respectively.

These systems and networks do not experience various setbacks associated with conventional technologies. Communications enabled by existing gateways may experience relatively higher cellular data rates than wi-fi data rates. In contrast, gateways being implemented according to the techniques discussed herein enable downlink cellular 5G data flow to be more closely aligned with the data flow between the gateways and through the wi-fi networks to end devices. By aligning the cellular 5G data flow with the wi-fi data flow, the gateways can be simplified with relatively smaller buffer pipes to optimize the data flows.

The methods, apparatuses, and systems described herein can be implemented in a number of ways. References are made to the accompanying drawings that form a part hereof, and in which are shown by way of illustration specific configurations or examples, in which like numerals represent like elements throughout the several figures.

Illustrative Systems for Downlink Data Communication Management

FIG. 1 is an exemplary system 100 for network characteristics-based downlink data communication management. As discussed herein, The downlink data communication management can be performed for one or more communications associated with data transmitted to one or more user equipment (UEs) 102. The data can include downlink data being communicated via one or more networks, such as one or more telecommunication networks (or "cellular networks") and/or any number of other networks. For example, the networks can include the cellular network(s) (e.g., one or more fifth-generation (5G) networks), one or more wi-fi networks, one or more other networks of one or more other types, or any combination thereof.

The UE(s) 102 can include any devices that can wirelessly connect to the telecommunication network. In some examples, the UE(s) 102 can include a mobile phone, such as a smart phone or other cellular phone. In other examples, the UE(s) 102 can include a voice-activated device (e.g., a voice-only activated device), a television (TV), a printer, a personal digital assistant (PDA), an internet-of-things device, a media player, a television (TV), speakers, headphones, a gaming device, a tablet computer, a computing device, a smart watch, a hotspot, a personal computer (PC) such as a laptop, desktop, or workstation, any other type of computing or communication device, or any combination thereof.

In various examples, communicating of the downlink data can be managed utilizing one or more network devices, such as a 5G gateway 104 and a base station 106. The 5G gateway 104 can be a modem or an access point, such as a Wi-fi access point, capable of sending and/or receiving data to and/or from the UE(s) 102 in accordance with 802.XX protocols (e.g., 802.11), although other protocols can be used. In various examples, the 5G gateway 104 can represent another type of gateway compatible with any telecommunications and/or 802.XX protocol and servicing a different from, or a same area as, the 5G gateway 104, such as a 4G gateway, an LTE gateway, etc., and/or any type of access point (e.g., wi-fi access point).

In some examples, the network device(s) can include one or more base stations, such as 5G gNBs using 5G NR radio access technologies, LTE evolved Node Bs (eNBs) using LTE radio access technologies, etc. The base station(s) can include the base station 106, which can be a gNB, and which can be utilized to route and/or transmit the downlink data. The base station 106 may be any sort of base station or wireless access point connected to other devices of the telecommunications network via, e.g., wired or wireless backhaul. The base station 106 may represent a single device or multiple devices (e.g., a base station and relay/extender/repeater, a macrocell device and a femtocell device, etc.). The base station 106 may include one or more antennae for radio frequency communications over, e.g., cellular radio frequency. In some examples, the base station 106 can represent another type of access point (e.g., a Wi-fi access point) compatible with any telecommunications and/or 802.XX protocol servicing a different area from, or a same area as, the 5G gateway 104.

Communicating the downlink data can include utilizing the UE(s) 102 and the network device(s) to perform various operations enabling the communicating. The communicating the downlink data can include transmitting, by the base station 106, the downlink data, which can include cellular downlink data (also referred to herein simply as "cellular data") 108, wi-fi downlink data (also referred to herein simply as "wi-fi data") 110, one or more other types of data, or any combination thereof. In some examples, the communicating the downlink data can include receiving, by the UE(s) 102 and from the base station 106, the downlink data. In those or other examples, the communicating the downlink data can include routing, by the 5G gateway 104, the downlink data from the base station 106 and to the UE(s) 102.

Various types of the downlink data, such as the regional downlink data and local downlink data can be analyzed in response to the communicating of the downlink data. For instance, analyzing the downlink data can include monitoring the cellular data 108 and the wi-fi data 110. The analyzing of the downlink data can include comparing one or more rates of delivery (also referred to herein as "rate of communication," "rate of transmission," etc.) of the cellular data 108 with one or more rates of delivery of the wi-fi data 110. By way of example, a rate (e.g., a rate "R1") of delivery of the cellular data 108 is compared with a rate (a rate "R2") of delivery of the wi-fi data 110 and utilized to generate a difference (or "data rate difference") between the rates. In such an example or another example, the rate R1 of delivery includes a local data rate of the downlink data; and the rate R2 of delivery includes a regional data rate of the downlink data. The scheduler can be utilized to analyze the data rate difference between the rates (e.g., between the local data rate and the regional data rate).

The rate of delivery of the wi-fi data 110 can include a combination of average rates of delivery of downlink data to different destination devices. One or more destination devices (e.g., one or more end-points) can be the UE(s) 102. In some examples, the rate of delivery of the wi-fi data 110 can include a sum of one or more rates of delivery of one or more individual portions of the wi-fi data 110 to one or more corresponding UE(s) 102. For instance, the rate of delivery of the wi-fi data 110 can be an aggregated local rate (e.g., an aggregated local rate of delivery). The sum can be identified as a summation of one or more individual averages of wi-fi-connection data rates between the gateway 104 and the corresponding UE(s) 102, over a period of time. Alternatively, the sum can be identified as a summation of any other types of delivery of the downlink data, such as a summation of one or more individual instantaneous wi-fi-connection data rates between the gateway 104 and the corresponding UE(s) 102 at a particular point in time.

The downlink data can be controlled by performing a comparison based on one or more differences between portions of the downlink data and one or more thresholds. For example, the difference can be analyzed utilizing a comparison with a difference threshold. A result of the comparison can be utilized to control the communicating of the cellular data 108, such as by throttling the cellular data 108. For instance, the cellular data 108 can be throttled based on the result being that a difference metric, as discussed in further below, representing the difference is greater than the difference threshold. In some examples, the rate of delivery of the cellular data 108 can be an aggregated regional rate (e.g., an aggregated regional rate of delivery).

The throttling being performed can include various types of throttling of delivery of the cellular data 108. The throttling can include causing downlink speeds of one or more groups (e.g., one or more partial groups, or a group with an entire amount) of the cellular data 108 to be slower. The throttling can include limiting bandwidth available for delivery of the cellular data 108. The throttling can include restricting, below a speed and/or bandwidth threshold (or "cap"), delivery of the cellular data 108. The throttling can include gradually and/or incrementally changing one or more speeds of individual group(s) of the cellular data 108.

Any aspects of the throttling can be controlled automatically and/or manually. For example, the throttling can include automated throttling and/or manual throttling of cellular downlink speeds. For instance, the manual throttling can be based on one or more selections received via user input to the 5G gateway 104, and/or one or more devices in communication with, and/or utilized to control/manage, the 5G gateway 104.

The throttling can be controlled based on scheduling. The throttling can include scheduling one or more of any of the various types of throttling (e.g., causing any of the types of throttling to begin at a day, time, etc.). The scheduling can include automated scheduling and/or manual scheduling. For instance, the manual scheduling can be based on one or more selections received via user input to the 5G gateway 104, and/or one or more devices in communication with, and/or utilized to control/manage, the 5G gateway 104.

The throttling can be triggered based on the comparison(s) (e.g., the comparisons between the difference metrics and the difference thresholds) and/or one or more types of one or more triggers. Individual ones of the trigger(s) can be automated (e.g., set by the 5G gateway 104) or manual (e.g., set by one or more selections via user input to the 5G gateway 104 and/or a device communicatively coupled thereto). Individual ones of trigger(s) and/or the threshold(s)

can be automatically selected, scheduled (e.g., selected based on one or more schedules being automated and/or manual), manually selected, and so on, or any combination thereof.

The difference threshold utilized to throttle the cellular data 108 can include any of various types of difference thresholds. In some examples, difference thresholds can be utilized to control throttling of the cellular data 108 at different amounts. For instance, relatively increasing difference thresholds can be utilized to control throttling of the cellular data 108 at relatively escalating amounts corresponding to the difference thresholds utilized for comparisons with difference metrics that increase over time. Alternatively or additionally, relatively decreasing difference thresholds can be utilized to control throttling of the cellular data 108 at relatively deescalating amounts corresponding to the difference thresholds utilized for comparisons with difference metrics that decrease over time.

In some cases, a difference threshold with a relatively lower value may be utilized to control throttling of the cellular data 108 at a relatively lower amount (e.g., at a lower percentage with respect to a current amount). For instance, a speed may be decreased to be a percentage of a current speed, with the percentage being relative to a size of the difference threshold (e.g., the difference threshold, with which a metric representing a difference between, for example, speeds of delivery of the cellular data 108 and the wi-fi data 110, is being compared). In such an instance or another instance, a lower percentage may be used for a lower difference threshold.

In some cases, a difference threshold with a relatively greater value may be utilized to control throttling of the cellular data 108 at a relatively greater amount (e.g., at a higher percentage with respect to a current amount). For instance, a greater percentage may be used for a greater difference threshold. However, any other type of relationship between the value of the difference threshold and the amount of the throttling may be utilized.

Various difference thresholds can be utilized based on different factors. For instance, a difference threshold used at a particular point in time can be greater than, or less than, another difference threshold used at a different point in time. Selection of the difference threshold can be based on a number of the UE(s) 102 connected to the 5G gateway 104, historical usage of the cellular data 108 and/or the wi-fi data 110, trends in usage of the cellular data 108 and/or the wi-fi data 110, usage period identifiers (e.g., identifiers associated with usage periods such as a peak usage period, an off-peak usage period, etc.), and so on, or any combination thereof.

Various types of content, which can include content and metrics 112, can be generated based on the downlink data. The content and metrics 112, such as one or more characteristics being included therein, and/or associated therewith, can be generated in response to the analyzing of one or more of the portions of the downlink data. The generated content and metrics 112 can include content associated with the cellular data 108, content associated with the wi-fi data 110, one or more types of other content, or any combination thereof. By way of example, cellular data rate-oriented content and metrics 114, which can include the content being generated based on the cellular data 108, can be included in the generated content. In such an example or another example, wi-fi data rate-oriented content and metrics 116, which can include the content being generated based on the wi-fi data 110, can be included in the generated content.

Various types of content can be included in the cellular data rate-oriented content and metrics 114 and/or the wi-fi data rate-oriented content and metrics 116. In some examples, the cellular data rate-oriented content and metrics 114 can include one or more metrics, such as a regional data rate metric (e.g., a cellular data rate metric), which can include a 5G data rate metric representing a data rate of the communicating of the cellular data 108. In those or other examples, the wi-fi data rate-oriented content and metrics 116 can include one or more metrics, such as a local data rate metric (e.g., a LAN data rate metric), which can include a wi-fi data rate metric representing a data rate of the communicating of the wi-fi data 110.

The content and metrics 112 can include various types of content and/or one or more types of metrics, which can be generated based on other content and/or metrics. For example, the cellular data rate-oriented content and metrics 114 and/or the wi-fi data rate-oriented content and metrics 116, can be included in the content and metrics 112.

The metric(s) can include one or more difference metrics and/or one or more comparison metrics generated based on the regional data rate metric (e.g., the 5G data rate) and the local data rate metric (e.g., the wi-fi data rate metric). For example, the difference metric(s) can include a difference metric representing a difference between the rate of delivery of the cellular data 108 and the rate of delivery of the wi-fi data 110. The comparison metric(s) can include a comparison metric representing a comparison between the difference metric and the difference threshold. By way of example, the comparison metric can include a metric that is a result of the comparison between the difference metric and the difference threshold.

The result of the comparison can be utilized to control the communicating of the cellular data 108, in various ways. For example, the result of the comparison can be utilized to throttle the cellular data 108. The cellular data 108 can be throttled based on the result indicating the difference metric is greater than the difference threshold.

Managing the downlink data based on the content and metrics 112 can be performed in various ways. In some examples, managing the downlink data can include controlling, such as throttling, delivery of the cellular data 108 based on the content and metrics 112. In those or other examples, the managing can include throttling delivery of the cellular data 108 based on the cellular data rate-oriented content and metrics 114 and the wi-fi data rate-oriented content and metrics 116. In those or other examples, the managing can include throttling delivery of the cellular data 108 based on the comparison result, which utilizes the difference metric representing the difference between the rate of delivery of the cellular data 108 and the rate of delivery of the wi-fi data 110. In those or other examples, the managing can include throttling delivery of the cellular data 108 based on the comparison result indicating that the difference metric is greater than the difference threshold.

Managing the downlink data based on the content and metrics 112 can be performed by various devices, including the base station 106. For instance, the managing of the downlink data can include throttling, by the base station 106, delivery of the cellular data 108 based on the content and metrics 112. In some examples cases, delivery of the cellular data 108 can be throttled, causing the rate of delivery of the cellular data 108 and the rate of delivery of the wi-fi data 110 to be substantially equivalent. In those or other examples cases, delivery of the cellular data 108 can be throttled, causing the difference metric representing the difference between the rate of delivery of the cellular data 108 and the rate of delivery of the wi-fi data 110 to be less than a difference threshold. In some examples, the difference threshold utilized to throttle delivery of, and/or to control throttling of delivery of, the cellular data 108 can be the same as, or different from, the difference threshold utilized to determine the comparison metric representing the comparison between the difference metric and the difference threshold, as discussed above.

In some cases, various types of content can be utilized by the base station 106 to perform the managing of the downlink data. The content utilized by the base station 106 to perform the managing of the downlink data can include wi-fi-based 5G communication control-oriented content and parameters 118. The content including the wi-fi-based 5G communication control-oriented content and parameters 118 can include one or more parameters identified based on the content and metrics 112.

Various types of parameters utilized to control the throttling can have values representing amounts of adjustment of the regional data rate. For example, the parameter(s) in the wi-fi-based 5G communication control-oriented content and parameters 118 can include a power oriented parameter (or "power parameter"), a temperature oriented parameter (or "temperature parameter"), a parameter having a value representing an amount of adjustment of the regional data rate, one or more other parameters or other types, or any combination thereof.

The parameter(s) can have one or more values utilized by the base station 106 to throttle delivery of the downlink data. For instance, individual parameter(s) having one or more relatively greater corresponding values can be utilized by the base station 106 to throttle delivery of the cellular data 108 more than other individual parameter(s) having one or more relatively lesser corresponding values.

For instance, with examples in which the parameter(s) are transmitted to, and received by, the base station 106, the parameter(s) can be utilized by the base station 106 to throttle delivery of the downlink data based on values of various types of parameters. In some examples, the parameter(s) can include a power parameter having a relatively greater corresponding value that is utilized by the base station 106 to throttle delivery of the cellular data 108 at a relatively greater level than another power parameter having a relatively lesser value. In those or other examples, the parameter(s) can include a temperature parameter having a relatively greater corresponding value that is utilized by the base station 106 to throttle delivery of the cellular data 108 at a relatively greater level than another temperature parameter having a relatively lesser value. In those or other examples, the parameter(s) can include a parameter, which has a value representing an amount of adjustment of the regional data rate, and which has a relatively greater corresponding value, to throttle delivery of the cellular data 108 at the base station 106 at a relatively greater level than another parameter, which has a value representing an amount of adjustment of the regional data rate, and which has a relatively lesser corresponding value.

The amount of adjustment of the regional data rate can include any of various types of amounts according to corresponding value(s) of the parameter(s), respectively. For example, the amount of adjustment of the regional data rate can include an amount of adjustment of delivery of the cellular data 108. The base station 106 can adjust delivery of the cellular data 108 by changing delivery of the cellular data 108 according to the amount of adjustment in the parameter of the wi-fi-based 5G communication control-oriented content and parameters 118. The delivery of the cellular data 108 can be throttled by the amount of adjustment in the parameter of the wi-fi-based 5G communication control-oriented content and parameters 118.

The content and metrics 112, and/or other types of content generated by the UE(s) 102 and/or the 5G gateway 104 can be utilized in various ways, alternatively or additionally, to throttling. For example, the UE(s) 102 can be utilized to alter the 5G gateway 104 so that the 5G gateway 104 can indicate to the network (e.g., the 5G cellular network), e.g., the base station 106, to reduce a number of component carriers (CCs), reduce a bandwidth (BW) here reduce carrier aggregation between the 5G gateway 104 and the base station 106. The number of CCs, the bandwidth, and/or the carrier aggregation being reduced may be based on the wi-fi-based 5G communication control-oriented content and parameters 118, for example.

Data type content, which can include one or more data type identifiers representing one or more data types associated with the downlink data, can be included in the cellular data rate-oriented content and metrics 114 and/or the wi-fi data rate-oriented content and metrics 116. The data type identifier(s) can be utilized to generate content and/or parameters (e.g., the wi-fi-based 5G communication control-oriented content and parameters 118), which can be utilized to control, e.g., throttle, delivery of the cellular data 108.

Although the downlink data can include the cellular data 108 and/or the wi-fi data 110, as discussed above in the current disclosure, it is not limited as such. In some examples, one or more groups of the cellular data 108 can be the same, or different from, one or more corresponding groups of the wi-fi data 110. For instance, the group(s) of the cellular data 108 can be routed by the 5G gateway 104 and communicated as the group(s) of the wi-fi data 110.

Although the terms "difference" and "difference metric" are utilized for purposes of simplicity of explanation, as discussed throughout the current disclosure, it is not limited as such. In some examples, the terms "difference" and "difference metric" can be interpreted as being interchangeable as appropriate with the context of the discussion.

Figure 2:
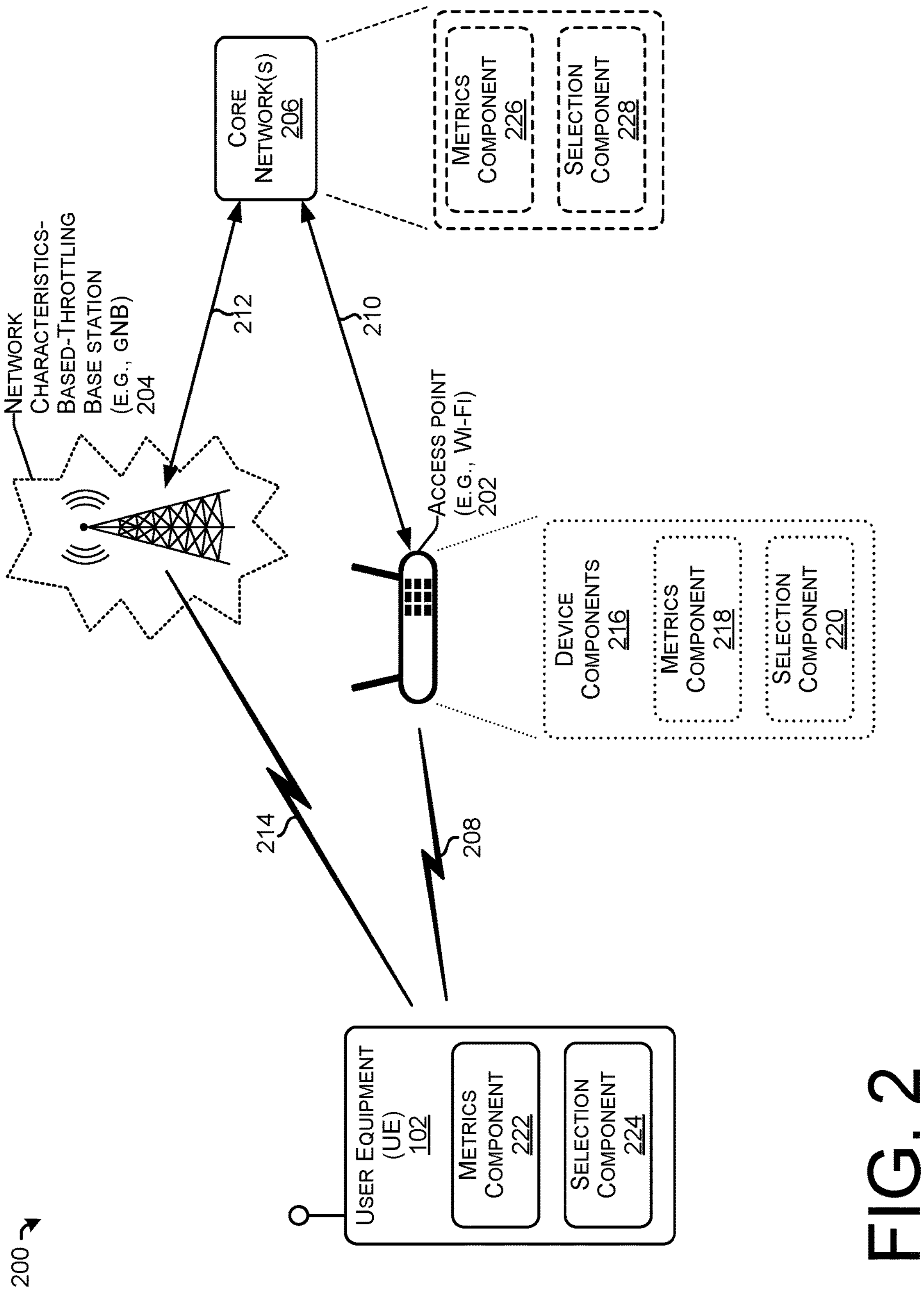
FIG. 2 is an exemplary system for network gateway-based, and throttling base station-driven, downlink data communication management.

FIG. 2 is an exemplary system 200 for network gateway-based, and throttling base station-driven, downlink data communication management. The management can be performed by one or more user equipment (UEs), an access point 202, a base station 204, one or more other devices of various types, or any combination thereof. The access point 202 can be, for example, a fifth-generation (5G) gateway (e.g., a gNodeB, or "gNB"). The base station 204 can be, for example, a network-characteristics based-throttling base station. In some examples, individual UE(s), the access point 202, and/or the base station 204 can be implemented utilizing corresponding UE(s) 102, the 5G gateway 104, and/or the base station 106, respectively, as discussed above with reference to FIG. 1.

The UE(s) 102, the access point 202, and the base station 204 can be connected to various types of networks. In some examples, the UE(s) 102, the access point 202, and the base station 204 can be connected to one or more cellular networks. In those or other examples, the cellular network(s) can be implemented utilizing the cellular network(s) communicating the cellular data 108, as discussed above with reference to FIG. 1. In some examples, the UE(s) 102 and the access point 202 can be connected to one or more wi-fi networks. In those or other examples, the wi-fi network(s) can be implemented utilizing the wi-fi network(s) utilized to communicate the wi-fi data 110, as discussed above with reference to FIG. 1.

The cellular network(s) can include one or more core networks 206. In some examples, the access point 202 and/or the base station 204 can be connected to the core network(s) 206.

Although the access point 202 and/or the base station 204 can be connected to the core networks 206, as discussed above in the current disclosure, it is not limited as such. In some examples the access point 202 and/or the base station 204 can be not connected to (e.g., restricted from being connected to) the core network(s) 206. In those or other examples, individual ones of the UE(s) 102 can be connected to the core network(s) 206. In those or other examples, individual ones of the UE(s) 102 can be not connected to (e.g., restricted from being connected to) the core network(s) 206.

The UE(s) 102, the access point 202, and/or the base station 204 can be utilized to communicate downlink data. The downlink data can include regional downlink data communicated between the access point 202 and the base station 204, such as from the base station 204 and to the access point 202. The downlink data can include local downlink data communicated between the UE(s) 102 and the access point 202, such as from the access point 202 and to the UE(s) 102. In some examples, the local downlink data communicated from the access point 202 and to the UE(s) 102 can include local area network (LAN) data (e.g., wi-fi data) 208. In those or other examples, the LAN data 208 can be implemented utilizing the wi-fi data 110, as discussed above with reference to FIG. 1. In some examples, the regional downlink data communicated from the base station 204 and to the access point 202 can include cellular data 210. In those or other examples, the cellular data 210 can be the implemented utilizing various types of cellular data (e.g., 5G telecommunications data), such as the cellular data 108, as discussed above with reference to FIG. 1.

The downlink data can include one or more other types of data. The other type(s) of downlink data can include regional downlink data 212 being communicated between the base station 204 and the core network(s) 206. In those or other examples, the regional downlink data 212 can be implemented utilizing various types of cellular data (e.g., 5G telecommunications data), such as the cellular data 108, as discussed above with reference to FIG. 1.

The other type(s) of downlink data can include regional downlink data 214 being communicated between the UE(s) 102 and the base station 204. In those or other examples, the regional downlink data 214 can be implemented utilizing various types of cellular data (e.g., 5G telecommunications data), such as the cellular data 108, as discussed above with reference to FIG. 1.

Although the LAN data 208, the cellular data 210, the cellular data 210, and/or the cellular data 214 may be communicated in the system 200, as discussed above in the current disclosure, it is not limited as such. In some examples, one or more groups of any the LAN data 208, the cellular data 210, the cellular data 210, or the cellular data 214 can be the same as, or different from one another. In some examples, one or more groups of other data can be communicated utilizing the UE(s) 102, the access point 202, the base station 204, the core network(s) 206, one or more other devices, or any combination thereof.

The access point 202 can include various components. The access point 202 can possibly include device components 216. The device components 216 can include a metrics component 218 and a selection component 220. The metrics component 218 can be implemented utilizing any portions of the 5G gateway 104. In some examples, the metrics component 218 can be utilized to perform any functions with respect to content and metrics managed by the access point 202. In those or other examples, the metrics component 218 can be utilized to perform any functions associated with the cellular data rate-oriented content and metrics 114 and/or the wi-fi data rate-oriented content and metrics 116, as discussed above with reference to FIG. 1. For instance, the metrics component 218 can be utilized to generate the cellular data rate-oriented content and metrics 114 and/or the wi-fi data rate-oriented content and metrics 116.

The selection component 220 can be utilized to perform any function associated with the content and metrics 112. In various cases, the selection component 220 can perform some or all of the functions of a scheduler (e.g., the scheduler in the 5G gateway 104, as discussed below with reference to FIG. 3). In some examples, the selection component 220 can be utilized to determine the difference metric representing the difference between the rate of delivery of the cellular data 108 and the rate of delivery of the wi-fi data 110, as discussed above with reference to FIG. 1. In those or other examples, the selection component 220 can be utilized to determine the comparison metric representing the comparison between the difference metric and the difference threshold, as discussed above with reference to FIG. 1. In those or other examples, the selection component 220 can be utilized to identify the wi-fi-based 5G communication control-oriented content and parameters 118 based on the content and metrics 112.

The UE(s) 102 can include one or more components of various types. In some examples, the UE(s) 102 can possibly include a metrics component 222 and a selection component 224. In some examples, the metrics component 222 and/or the selection component 224 can be implemented to perform any functions in a similar way as the metric component 218 and/or the selection component 220, respectively. In various cases, the selection component 224 can perform some or all of the functions of the scheduler. For instance, such as with the metrics component 222 and/or the selection component 224 being included In individual UE(s) 102, any of the UE(s) 102 can include, and/or operate in a similar way as, the access point 202. In some cases, individual UE(s) 102 can be directed connected to the core network(s) 206, without an intermediary connection to the access point 202, based on the any of the UE(s) 102 including, and/or operating in a similar way as, the access point 202.

The core network(s) 206 can include one or more components of various types. In some examples, the core network(s) 206 can possibly include a metrics component 226 and a selection component 228. In some examples, the metrics component 226 and/or the selection component 228 can be implemented to perform any functions in a similar way as the metric component 218 and/or the selection component 220, respectively. In various cases, the selection component 228 can perform some or all of the functions of the scheduler. In some examples, the metrics component 226 and/or the selection component 228 can be implemented to perform any functions based on the core network(s) 206 receiving various content and/or metrics, such as the content and metrics 112, from the UE(s) and/or the access point 202.

Figure 3:
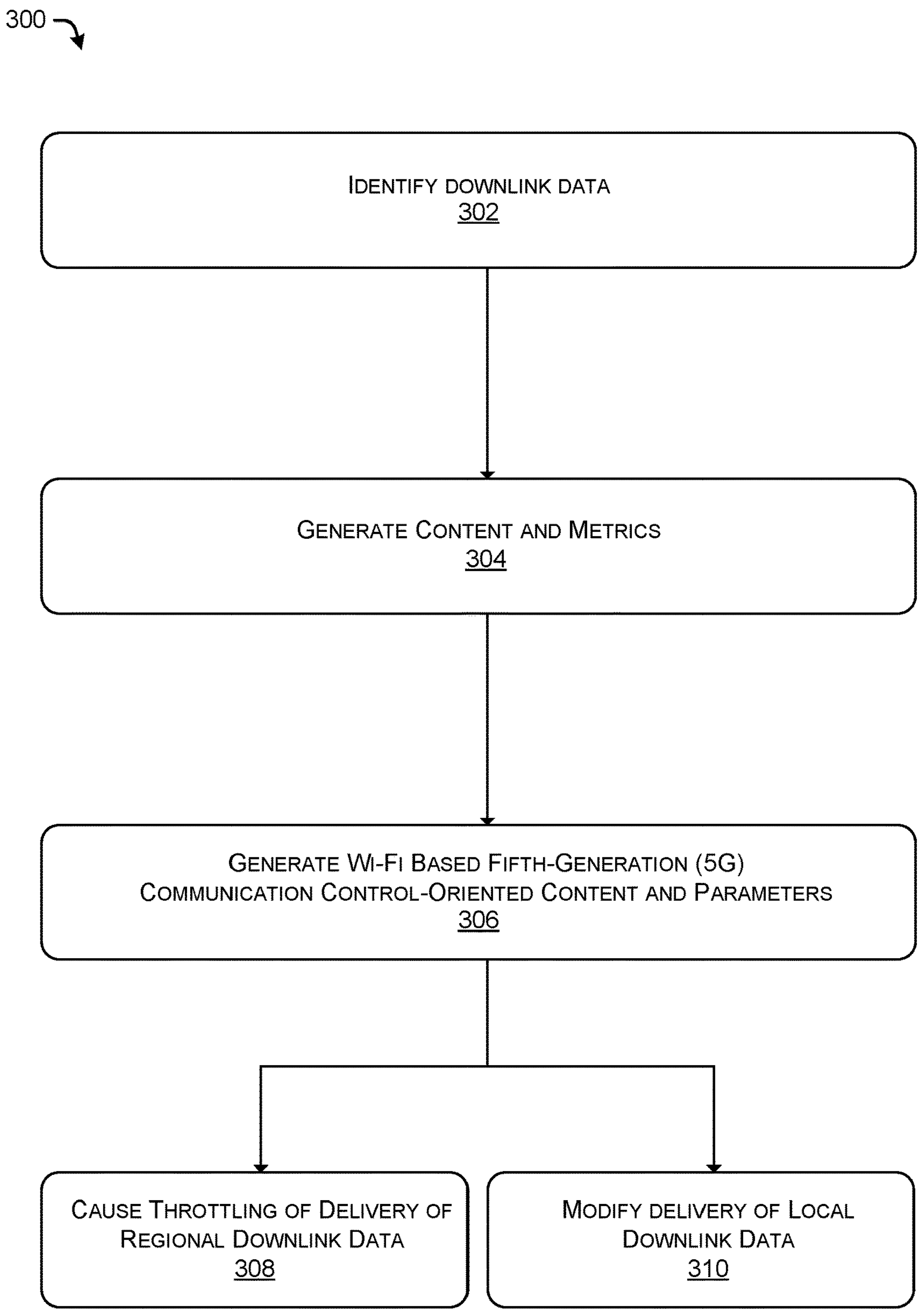
FIG. 3 is a dataflow diagram illustrating an example process 300 for network characteristics-based downlink data communication management.

FIG. 3 is a dataflow diagram illustrating an example process 300 for network characteristics-based downlink data communication management. Process 300 can be performed, e.g., by one or more user equipment (UEs), a fifth-generation (5G) gateway, and/or a base station (e.g., the UE(s) 102, the 5G gateway 104, the base station 106, respectively, as illustrated above with reference to FIG. 1. Operations shown in FIG. 3, discussed below, can be performed in any order except when otherwise specified, or when data from an earlier step is used in a later step.

At 302, the process 300 can include identifying downlink data. For example, the 5G gateway 104 can identify the downlink data, such as cellular data and/or wi-fi data (e.g., the cellular data 108 and/or the wi-fi data 110, respectively, as discussed above with reference to FIG. 1).

At 304, the process 300 can include generating, e.g., by the 5G gateway 104, content and metrics. For example, content generated by the 5G gateway 104 can include various types of content and/or various types of metrics, such as the content and metrics 112, as discussed above with reference to FIG. 1.

Analysis performed by the 5G gateway 104 to generate the content and metrics 112, and/or any other type of analysis performed by the 5G gateway 104 can include heuristic based and/or machine learning (ML) model-based analysis. For example, the analysis can include analysis via one or more artificial intelligence (AI) models, one or more machine learning (ML) models, or any combination thereof.

The ML model(s) used by the techniques and systems described herein may represent a single model or an ensemble of base-level ML models, and may be implemented as any type of ML model. For example, suitable ML models for use by the techniques and systems described herein include, without limitation, neural networks (e.g., generative adversarial networks (GANs), deep neural networks (DNNs), recurrent neural networks (RNNs), etc.), tree-based models (e.g., eXtreme Gradient Boosting (XGBoost) models), support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can comprise a collection of ML models whose outputs (predictions) are combined, such as by using weighted averaging or voting. The individual ML models of an ensemble can differ in their expertise, and the ensemble can operate as a committee of individual ML models that is collectively "smarter" than any individual ML model of the ensemble.

The ML model(s) can be trained based any type of data, such as data received by the 5G gateway 104, and/or any other device, such as any of the UE(s) 102. In some examples, data utilized to train the ML model(s) can include a training dataset, which can include one or more features and/or one or more labels. However, the training dataset may be unlabeled, in some examples. Accordingly, the ML model(s) described herein may be trained using any suitable learning technique, such as supervised learning, unsupervised learning, semi-supervised learning, reinforcement learning, and so on. The features included in the training dataset can be represented by a set of features, such as in the form of an n-dimensional feature vector of quantifiable information about an attribute of the training dataset.

The 5G gateway 104 can include a scheduler (e.g., a scheduler implemented at a media access control (MAC) layer). In some examples, the scheduler can be utilized to control data delivery rates and/or bandwidth (e.g., streaming data-related rates and/or bandwidth, web browsing data-related rates and/or bandwidth), latency, QoS, any other types of performance aspects, etc., or any combination thereof. In those or other examples, the scheduler can be used to optimize one or more user experiences associated with the UE(s) 102, accordingly.

The content generated by 5G gateway 104 can be generated by various components of the 5G gateway 104. For example, any content generated by the 5G gateway 104 can be generated by the scheduler in the 5G gateway 104. The scheduler for the wi-fi data 110 can be implemented in a similar way as for any other type of cellular data-oriented scheduler (e.g., any scheduler, such as a fourth-generation (4G)/5G scheduler, e.g., which may be in the base station 106 and/or any other network node/device) implemented for controlling communicating of the cellular data 108.

The content generated by 5G gateway 104 can include one or more categories associated the local wi-fi data 110, and/or content (or "category related content") associated therewith. The content, such as the category related content, can be generated based on one or more prediction values (or "traffic prediction value(s)") representing one or more predictions, and/or one or more estimation values representing estimations, calculated by the 5G gateway 104. The prediction value(s) and/or the estimation value(s) can be generated by the 5G gateway 104 analyzing the cellular data 108.

The prediction value(s) can represent various types of predictions. Individual prediction(s) can include a forecast as a statement about a future event or about future data associated with the cellular data 108.

The estimation value(s) can represent various types of estimation(s). Individual estimation(s) can include a rough calculation of one or more current and/or future values, one or more current and/or future numbers, one or more current and/or future quantities, and/or one or more current and/or future extents of the cellular data 108.

The prediction value(s) and/or the estimation value(s) can be generated by the 5G gateway 104 performing various types of analyses. For example, the prediction value(s) and/or the estimation value(s) can be generated by the 5G gateway 104 performing deep packet inspection (DPI) of the downlink data, such as the cellular data 108. For example, the DPI can include ML model-based DPI of the downlink data.

Various types of DPI can be performed. For example, based on an end-point address associated with an end-point (e.g., a UE 102), the 5G gateway 104 can identify an estimate identifier reflecting an estimate of whether the UE 102 is being utilized for a type of application (e.g., based on an application ID), to identify a probability identifier reflecting a probability of whether the UE 102 is going to be utilized for streaming. A relatively higher estimate identifier may correspond to a relatively higher probability. The probability identifier can be utilized to determine and/or categorize wi-fi traffic based on a prediction and/or an estimation of the wi-fi traffic.

In some examples, the 5G gateway 104 can identify the wi-fi-based 5G communication control-oriented content and parameters 118 based on data type content, application identifier content, and/or any other of one or more various types of content. The data type content can include one or more data type identifiers representing data type of the cellular data 108, one or more application identifiers representing one or more application types of the cellular data 108, and/or the other various type(s) of content.

The category related content can include one or more category identifiers associated with one or more categories of the downlink data (e.g., the cellular data 108). The category identifier(s) can be generated based on the prediction value(s) and/or the estimation value(s).

The content generated by 5G gateway 104 can include one or more group identifiers representing one or more groups of the local wi-fi data 110. Alternatively or additionally, the content generated by 5G gateway 104 can include content (or "group related content") associated with the group(s).

At 306, the process 300 can include generating, e.g., by the 5G gateway 104, wi-fi based 5G communication control-oriented content and parameters. For example, content generated by the 5G gateway 104 can include various types of content and/or various types of parameters, such as the wi-fi-based 5G communication control-oriented content and parameters 118, as discussed above with reference to FIG. 1.

At 308, the process 300 can include causing, e.g., by the 5G gateway 104, throttling of delivery of regional downlink data by the base station 106. For example, the 5G gateway 104 can provide (e.g., transmit) the wi-fi-based 5G communication control-oriented content and parameters 118 to the base station 106. The base station 106 can throttle delivery of the cellular data based on the content and metrics 112.

At 310, the process 300 can include modifying, e.g., by the 5G gateway 104, delivery of local downlink data, e.g., the wi-fi data 110. The 5G gateway 104 can identify one or more groups of the wi-fi data 110. The group(s) can be identified based on the group(s) being generated by the UE(s) 102. By utilizing the group(s) identified by the UE(s) 102, the 5G gateway 104 can more effectively control delivery of the wi-fi data 110 to possibly reduce amounts of throttling required to be performed by the base station 106.

Controlling of delivery of the local downlink data (e.g., the wi-fi data 110) can include controlling (e.g., modifying) delivery of the local downlink data in various ways. The controlling of delivery of the local downlink data can include various types of controlling to enable performance (e.g., bandwidth, latency, throughput, packet loss, error rates, retransmission rates, etc.) of delivery of the local downlink data to catch up to, and/or to be closer to, performance of delivery of the regional downlink data (e.g., the cellular data 108). The performance of delivery of the local downlink data can be improved by the controlling of delivery of the local downlink data. The controlling of delivery of the local downlink data can be performed in response to the content and metrics 112 (e.g., difference content, such as content including the difference metric, comparison content, such as content including the comparison metric, and so on, or any combination thereof), and/or analysis therefor.

For example, as discussed below in further detail, controlling (e.g., the modifying) of delivery of the local downlink data can include differentiated services code point (DSCP) marking-based controlling, quality of service (QoS)-based controlling, local downlink data classifications/groups-based controlling (e.g., network slices-based controlling), various types of ML-based controlling, manual/user-based controlling, automated controlling, one or more other types of controlling, or any combination thereof. Any of the various types of controlling can be separate from one another, and/or integrated with any number of the other types. The controlling of delivery of the local downlink data can be performed, alternatively or in addition to, controlling of delivery of the regional downlink data (e.g., causing throttling of delivery of the regional downlink data). In various examples, the controlling (e.g., modifying) of the delivery of the local downlink data can represent any type of controlling of the delivery of the locally downlink data.

The group(s) of the wi-fi data 110 can be generated in various ways. For example, the group(s) of the wi-fi data 110 can be generated utilizing analysis via DSCP marking. The DSCP marking can include classifying and managing network traffic and providing QoS (e.g., providing QoS in one or more layer three internet protocol (IP) networks) for individual communications and/or individual groups of communications in a wi-fi network by which the wi-fi data 110 is communicated. The classifying and providing QoS can be performed for individual ones of the group(s). In some examples, the DSCP marking can be utilized to provide low-latency to critical network traffic, such as to individual ones of the groups associated with voice and/or streaming media traffic, from among traffic associated with delivery of the wi-fi data 110. In some examples, the DSCP marking can be utilized to provide best-effort service to non-critical services, such as to individual ones of the groups associated with web traffic and/or file transfer traffic from among traffic associated with delivery of the wi-fi data 110.

The DSCP marking can be performed for individual group(s) of the wi-fi data 110 of various types. The DSCP marking can enable a session management function (SMF) in the wi-fi network, and/or in a 5G core network (e.g., a core network associated with, and/or included within, a 5G network, by which the cellular data 108 is communicated), to perform traffic classification and prioritization to provide the appropriate QoS treatment for the cellular data 108 and/or the wi-fi data 110. The SMF can track protocol data unit (PDU) sessions and QoS flows in the wi-fi network, and/or in the 5G core network, for the UE(s) 102. The SMF can ensure that one or more states and/or one or more statuses of corresponding UE(s) 102 are in sync between network functions in control and user planes. In some cases, any other type of device and/or node can, alternatively or additionally to the SMF, perform one or more of the functions of the SMF, as discussed above.

The group(s) of the wi-fi data 110 can have one or more corresponding types of groups. The group(s) of the wi-fi data 110 can be identified as one more network slices (or "wi-fi network slice(s)") of the wi-fi data 110.

The network slice(s) associated with the wi-fi data 110 can have one or more corresponding types of network slice(s). For example, the network slice(s) associated with the wi-fi data 110 can be the same as, or different from, one or more other network slices (e.g., one or more network slices generated by another scheduler of the base station 106) of the cellular data 108. In some cases, individual ones of the network slice(s) can be associated with a corresponding UE 102. Any number of slices can be associated with an individual UE 102. An individual network slice associated with the wi-fi data 110 can include a QoS class identifier (QCI) and a QoS.

In some examples, the 5G gateway 104 can manage communication of the wi-fi data 110 based on individual ones of the group(s) of the wi-fi data 110 generated by the UE 102. The group(s) of the wi-fi data 110 can be generated, in some cases, based on an application identifier (ID) with which an individual group is associated. In those or other examples, individual ones of the UE(s) 102 can generate one or more individual groups of the wi-fi data 110 up, and/or an application ID with which an individual group is associated.

In some instances, alternatively or additionally to the generating of the group(s) of the wi-fi data 110, and/or the application ID(s) by the UE(s) 102, the 5G gateway 104 can generate one or more individual groups, and/or an application ID with which an individual group is associated. In such instances, the 5G gateway 104 can generate the group(s) of the wi-fi data 110, and/or the application ID(s), if a corresponding application is triggering group(s) (e.g., the network slice(s) from the 5G gateway 104 (e.g., the router).

In various cases, the DSCP marking (also referred to herein as "TCP marking") can include marking data over traffic control plan (TCP) traffic. For example, TCP can be utilized as a communications standard to deliver data and messages through networks (e.g., the wi-fi network and/or the cellular network). TCP can be utilized to define rules of the internet and as a common protocol to deliver data in digital network communications (e.g., communications including the cellular data 108 and/or the wi-fi data 110). TCP can be utilized for direct communications associated with data, which can include the cellular data 108 and/or the wi-fi data 110. TCP can be utilized for direct communications associated with data communications for which a reliable connection is needed, such as web browsing, email, text messaging, file transfers, other types of data, or any combination thereof.

The TCP marking can be utilized to mark individual packets of the wi-fi data 110. In some examples, a beginning of individual streams of traffic associated with delivery of the wi-fi data 110 can be marked via the TCP marking. In those or other examples, a beginning of individual frames of traffic associated with delivery of the wi-fi data 110 can be marked via the TCP marking. The 5G gateway 104 can prioritize the network slice(s). For example, the network slice(s) can include a video streaming slice, a low-latency slice, etc. The 5G gateway 104 can then prioritize traffic through the wi-fi network by assigning a priority identifier to an individual network slice.

In contrast to existing technology (e.g., technology that does not, prioritize network slice(s) for wi-fi data), by prioritizing certain types of data with certain priority identifiers, efficiency of the 5G gateway 104 can be respectively improved. The 5G gateway 104 can schedule non-high priority traffic around other high priority traffic. Alternatively or additionally, an individual UE 102 can request a high priority delivery of the wi-fi data 110 by requesting prioritization from the 5G gateway 104.

In various examples, the network slice(s) can be assigned by the UE 102 (e.g., and/or the 5G gateway 104 if application is triggering the slice from the router, such as the 5G gateway 104) based on one or more subscriber requests. For instance, request data received by the 5G gateway 104 and from the UE 102 based on one or more selections received via user input to an individual UE 102 may be utilized by the 5G gateway 104 to identify and/or prioritize portions of the wi-fi data 110 via the network slice(s). Alternatively or additionally, network slice data associated with request data may be received by the 5G gateway 104 and from the UE 102, the request data being received by the UE 102 based on one or more automated selections generated by an individual UE 102. The automated selection(s) may be generated based on the UE 102 identifying (e.g., automatically predicting) (e.g., receiving, such as from the base station 106) a priority associated with corresponding data to be received. The network slice(s) can be assigned based on any of the different types of request data, and/or based on a type of request data being identified and utilized to overrule another type of request data. For example, the user generated request data, as determined by the 5G gateway 104, the UE 102, etc., or any combination thereof, may overrule the automatically generated request data, or vice versa, with respect to assigning the network slice(s).

In some examples, uplink data of wi-fi data that includes the wi-fi data 110, and/or the cellular data 108, can receive a same type of prioritization (e.g., QoS), and/or same type of any other performance modifications, as downlink data of the wi-fi data 110 and/or the cellular data 108. The controlling of the uplink data can be performed as reflected control (e.g., a reflected QoS, etc.), with respect to control of the downlink data.

Although the network slice(s) can be managed as discussed above in the current disclosure, it is not limited as such. In some examples, any of the managing with respect to the network slice(s) can be performed for other types of network slices, such as one or more network slices associated with any other data (e.g., the cellular data 108), in a similar way as for the network slice(s) associate with the wi-fi data 110.

Figure 4:
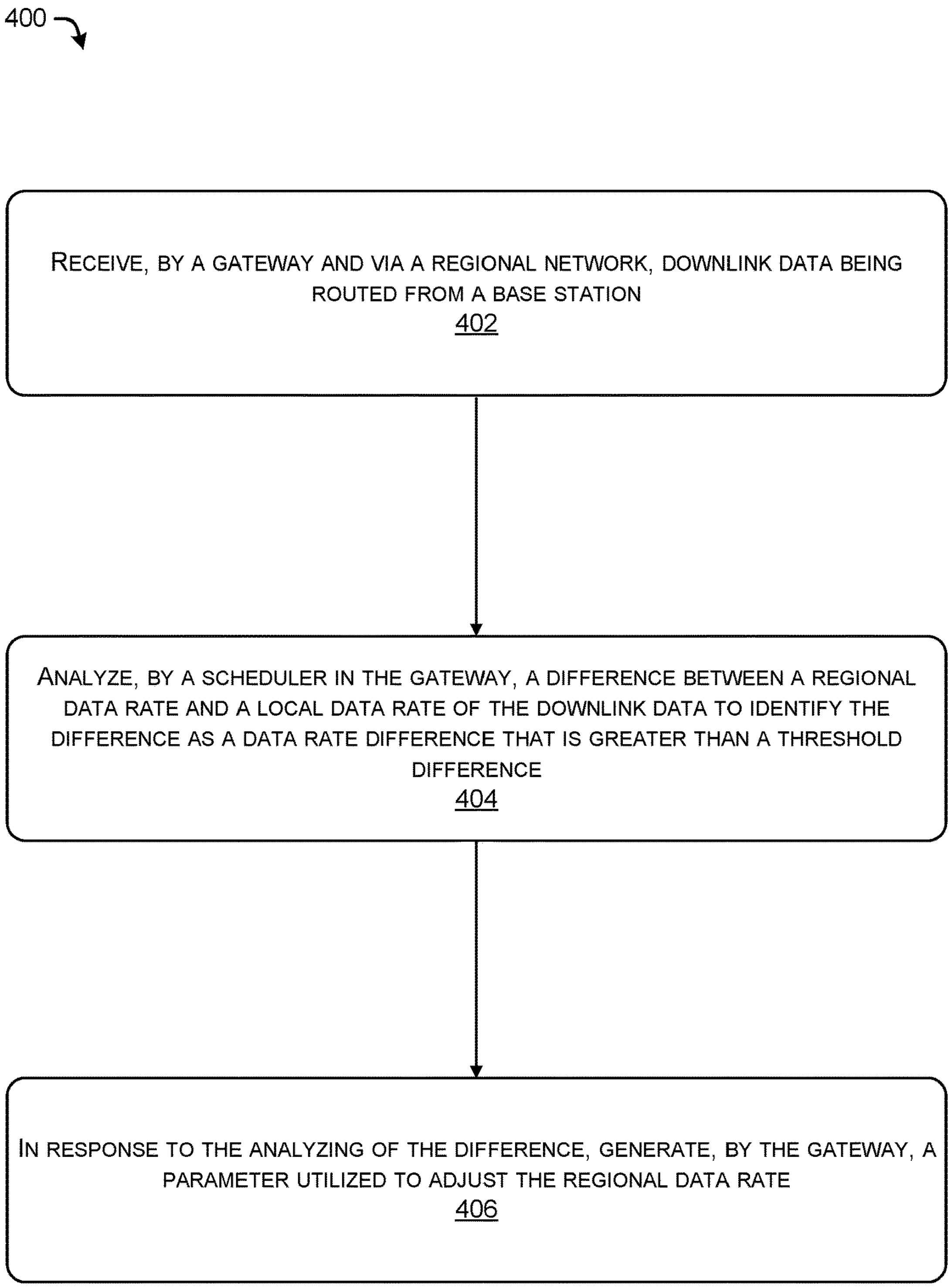
FIG. 4 is a flow diagram of an illustrative process 400 for network characteristics-based downlink data communication management.

FIG. 4 is a flow diagram of an illustrative process 400 for network characteristics-based downlink data communication management. For example, the process 400 can be performed by the system 100. Operations shown in FIG. 4 can be performed in any order except when otherwise specified, or when data from an earlier step is used in a later step. For clarity of explanation, reference is herein made to various components shown in FIGS. 1-3 that can carry out or participate in the steps of the exemplary method. It should be noted, however, that other components can be used; that is, exemplary method(s) shown in FIG. 4 not limited to being carried out by the identified components.

At step 402, the process can include receiving, by a gateway and via a regional network, downlink data being routed from a base station. For example, the gateway, such as the 5G gateway 104, can receive the downlink data. The downlink data being received can include the cellular data 108. The cellular data can be routed by, and received from, the base station, such as the base station 106.

At step 404, the process can include analyzing, by a scheduler in the gateway, a difference between a regional data rate and a local data rate of the downlink data to identify the difference as a data rate difference that is greater than a threshold difference. The scheduler in the gateway, such as the 5G gateway 104, can be utilized to analyze the data rate difference. The data rate difference being analyzed can include the difference between the regional data rate, such as the 5G data rate, and the local data rate, such as the wi-fi data rate.

At step 406, the process can include, in response to the analyzing of the difference, generating, by the gateway, a parameter utilized to adjust the regional data rate. The gateway, such as the 5G gateway 104, can generate the parameter utilized by the base station 106 to adjust the regional data rate, such as the cellular data rate.

Figure 5:
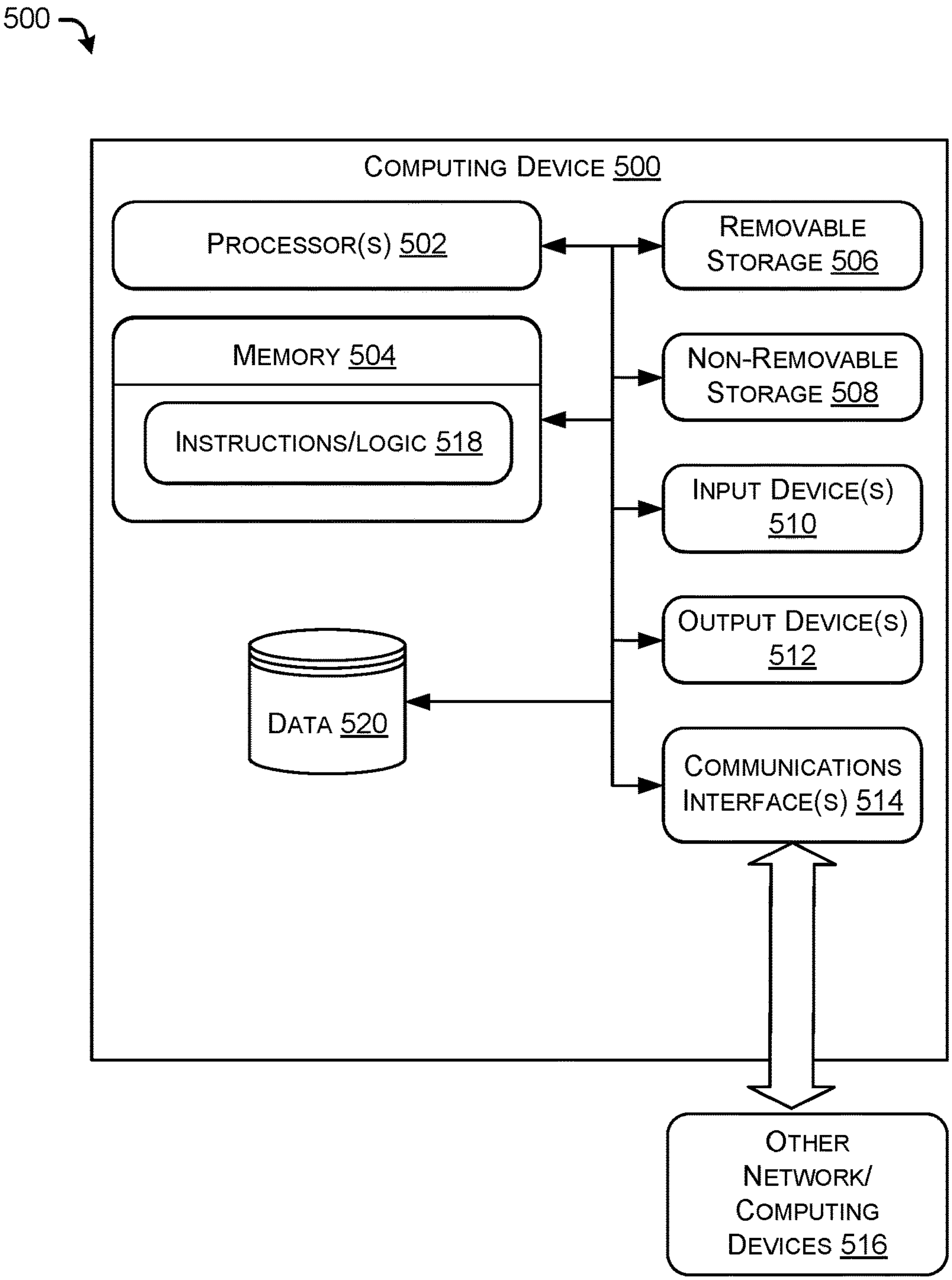
FIG. 5 is a block diagram of an example computer 500 utilized to implement network characteristics-based downlink data communication management.

FIG. 5 is a block diagram of an example computer 500 utilized to implement network characteristics-based downlink data communication management. The computer 500 may be representative of the 5G gateway 104, the base station 106, one or more other devices of the cellular network or the wi-fi network, as discussed above with reference to FIG. 1, or any combination thereof.

As shown, the server computer 500 may include one or more processors 502 and one or more forms of computer-readable memory 504. The server computer 500 may also include additional storage devices. Such additional storage may include removable storage 506 and/or non-removable storage 508.

The server computer 500 may further include input devices 510 (e.g., a touch screen, keypad, keyboard, mouse, pointer, microphone, etc.) and output devices 512 (e.g., a display, printer, speaker, etc.) communicatively coupled to the processor(s) 502 and the computer-readable memory 504. The server computer 500 may further include communications interface(s) 514 that allow the server computer 500 to communicate with other network and/or computing devices 516 (e.g., the 5G gateway 104, the base station 106, one or more other devices of the cellular network or the wi-fi network) such as via a network. The communications interface(s) 514 may facilitate transmitting and receiving wired and/or wireless signals over any suitable communications/data technology, standard, or protocol, as described herein.

In various examples, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 may also be described as computer storage media and may include volatile and nonvolatile, removable and non-removable media implemented in any method or technology for storage of information, such as computer readable instructions, data structures, program modules, or other data. Computer-readable memory 504, removable storage 506 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server computer 500. Any such computer-readable storage media may be part of the server computer 500.

The memory 504 can include logic 518 (i.e., computer-executable instructions that, when executed, by the processor(s) 502, perform the various acts and/or processes disclosed herein) to implement network characteristics-based downlink data communication management, according to various examples as discussed herein. For example, the logic 518 is configured to carry out network characteristics-based downlink data communication management. The memory 504 can further be used to store data 520, which may be used to implement network characteristics-based downlink data communication management, as discussed herein. In one example, the data 520 may include various types of data (e.g., the cellular data 108, the wi-fi data 110) associated with the cellular network and/or the wi-fi network, any other type of data, and so on, or any combination thereof.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A method comprising:

receiving, by a gateway and via a regional network, downlink data being routed from a base station;

analyzing, by a scheduler in the gateway, a difference between a regional data rate and a local data rate of the downlink data to identify the difference as a data rate difference that is greater than a threshold difference;

in response to the analyzing of the difference, generating, by the gateway, a parameter utilized to adjust the regional data rate, wherein the parameter includes a power parameter; and adjusting the regional data rate by transmitting the power parameter to the base station that throttles the regional data rate based on the power parameter.

2. The method of claim 1, wherein the regional network is a cellular network, and a local network associated with the local data rate is a wi-fi network.

3. The method of claim 1, wherein the parameter includes a temperature parameter, and wherein adjusting the regional data rate further comprises:

transmitting the temperature parameter to the base station that throttles the regional data rate based on the temperature parameter.

4. The method of claim 1, wherein the parameter has a value representing an amount of adjustment of the regional data rate, and wherein adjusting the regional data rate further comprises:

transmitting the parameter to the base station that throttles the regional data rate based on the value of the parameter.

5. The method of claim 1, further comprising:

analyzing, by the scheduler, a traffic characteristic of the downlink data to identify a traffic prediction value corresponding to a type of traffic generated by communication of the downlink data, wherein the parameter is generated based on the traffic prediction value.

6. The method of claim 1, further comprising:

identifying, by the scheduler and via inspection of the downlink data, at least one of data type content or application identifier content, wherein the parameter is generated based on the at least one of the data type content or the application identifier content.

7. The method of claim 1, wherein the regional data rate is an aggregated regional data rate associated with destination devices, and the local data rate is an aggregated local data rate associated with the destination devices, and wherein analyzing the difference further comprises:

analyzing the difference between the aggregated regional data rate and the aggregated local data rate to identify that the difference is greater than a second threshold difference.

8. The method of claim 1, wherein analyzing the difference further comprises:

performing, by a machine learning (ML) model in the scheduler, deep packet inspection (DPI) analysis of the downlink data.

9. A system comprising:

at least one processor; and non-transitory memory storing instructions that, when executed by the at least one processor, cause the at least one processor to perform operations comprising:

receiving, by a gateway and via a regional network, downlink data being routed from a base station;

analyzing, by a scheduler in the gateway, a difference between a regional data rate and a local data rate of the downlink data to identify the difference as a data rate difference that is greater than a threshold difference;

in response to the analyzing of the difference, generating, by the gateway, a parameter utilized to adjust the regional data rate, wherein the parameter has a value representing an amount of adjustment of the regional data rate; and adjusting the regional data rate by transmitting the parameter to the base station that throttles the regional data rate based on the value of the parameter.

10. The system of claim 9, wherein the regional network is a cellular network, and a local network associated with the local data rate is a wi-fi network.

11. The system of claim 9, wherein the parameter includes a power parameter, and wherein adjusting the regional data rate further comprises:

transmitting the power parameter to the base station that throttles the regional data rate based on the power parameter.

12. The system of claim 9, wherein the parameter includes a temperature parameter, and wherein adjusting the regional data rate further comprises:

transmitting the temperature parameter to the base station that throttles the regional data rate based on the temperature parameter.

13. The system of claim 9, the operations further comprising:

modifying delivery of wi-fi data with which the local data rate is associated.

14. A server comprising:

at least one processor; and non-transitory memory storing instructions that, when executed by the at least one processor, cause the at least one processor to perform operations comprising:

receiving, by a gateway and via a regional network, downlink data being routed from a base station;

analyzing, by a scheduler in the gateway, a difference between a first data rate and a second data rate of the downlink data to identify the difference as a data rate difference that is greater than a threshold difference based at least in part on performing, by a machine learning (ML) model in the scheduler, deep packet inspection (DPI) analysis of the downlink data; and in response to the analyzing of the difference, generating, by the gateway, a parameter utilized to adjust the regional data rate.

15. The server of claim 14, wherein the regional network is a cellular network, a local network associated with the second data rate is a wi-fi network, the first data rate is a cellular data rate, and the second data rate is a wi-fi data rate.

16. The server of claim 15, wherein the parameter includes a power parameter, and wherein adjusting the cellular data rate further comprises:

transmitting the power parameter to the base station that throttles the cellular data rate based on the power parameter.

17. The server of claim 15, wherein the parameter includes a temperature parameter, and wherein adjusting the cellular data rate further comprises:

transmitting the temperature parameter to the base station that throttles the cellular data rate based on the temperature parameter.

18. The server of claim 15, wherein the parameter has a value representing an amount of adjustment of the cellular data rate, and wherein adjusting the cellular data rate further comprises:

transmitting the parameter to the base station that throttles the cellular data rate based on the value of the parameter.

19. The server of claim 14, wherein the regional data rate is an aggregated regional data rate associated with destination devices, and the local data rate is an aggregated local data rate associated with the destination devices, and wherein analyzing the difference further comprises:

analyzing the difference between the aggregated regional data rate and the aggregated local data rate to identify that the difference is greater than a second threshold difference.

20. The server of claim 14, the operations further comprising:

identifying, by the scheduler and via inspection of the downlink data, at least one of data type content or application identifier content, wherein the parameter is generated based on the at least one of the data type content or the application identifier content.

* * * * *